United States Patent [19]

Slovinsky

[11] 4,295,762
[45] Oct. 20, 1981

[54] GROUTING-SOIL CONDITIONING SYSTEMS USING POLYOXYETHYLENE DIACRYLATES

[75] Inventor: Manuel Slovinsky, Woodridge, Ill.

[73] Assignee: Nalco Chemical Company, Oak Brook, Ill.

[21] Appl. No.: 188,185

[22] Filed: Sep. 18, 1980

Related U.S. Application Data

[63] Continuation-in-part of Ser. No. 13,105, Feb. 21, 1979, abandoned.

[51] Int. Cl.³ .............................................. C09K 17/00
[52] U.S. Cl. ...................................... 405/264; 71/903; 526/323.1
[58] Field of Search ........................ 405/263, 264, 266; 71/27, 903; 47/58, DIG. 10; 526/323.1

[56] References Cited

U.S. PATENT DOCUMENTS

| | | | |
|---|---|---|---|
| 2,215,219 | 9/1940 | Haax | 526/323.1 X |
| 3,041,322 | 6/1962 | Krieble | 526/323.1 X |
| 3,371,712 | 3/1968 | Adams | 405/264 X |
| 3,417,567 | 12/1968 | Higashimura et al. | 405/264 |
| 3,607,848 | 9/1971 | Stoy et al. | 526/323.1 |
| 4,034,145 | 7/1977 | Gruber et al. | 526/323.1 |
| 4,056,670 | 11/1977 | Skoultchi | 526/323.1 X |

FOREIGN PATENT DOCUMENTS 630632  10/1949  United Kingdom ............. 526/323.1

Primary Examiner—S. Leon Bashore
Assistant Examiner—F. Lander
Attorney, Agent, or Firm—John G. Premo; Robert A. Miller

[57] ABSTRACT

A process of stabilizing soil which comprises contacting such soil with an aqueous solution of a water-soluble diacrylate ester of a polyoxyalkylene glycol monomer, which solution also contains a water-soluble polymerization catalyst capable of polymerizing the monomer into a water-insoluble gel.

10 Claims, No Drawings

GROUTING-SOIL CONDITIONING SYSTEMS USING POLYOXYETHYLENE DIACRYLATES

This application is a continuation-in-part of co-pending application No. 13,105, filed Feb. 21, 1979, and now abandoned.

INTRODUCTION

In the fields of civil engineering and construction works, it has hitherto been practiced, as a means of congealing and solidifying soil, the method of applying inorganic substance thereinto, for example, such as cement, water glass and the like, applying these inorganic substances into soil having large interstices involved therein results in a helpful result. Because of high viscosity thereof, however, they are poor in permeability for such soil as having minute interstices involved therein, whereby the object thereof cannot be satisfactorily accomplished. For solidifying soil having minute interstices involved therein, therefore, there has been employed the method which comprises applying chemical solution thereinto.

In the chemical solution pouring method, a method of treating soil is a method which comprises first preparing an aqueous solution containing polymerizable substance, applying said aqueous solution into soil to polymerize and further converting said polymerizable substance into a water-insoluble state having three dimensional structure to form a strong polymerized product-soil concentrated mass.

The requirements desired in the field of civil engineering and construction works are first to strengthen the foundation and to make the subsequent works easy and, also, to carry out the grouting for preventing gushing water during tunnel or underground works and to prevent soil collapse and so forth. In order to satisfy the requirements mentioned above, it is necessary to employ chemical agent which is capable of sufficiently permeating into throughout minute interstices involved in soil and rapidly forming a water-insoluble composition structure having high strength.

Several chemical solutions for soil solidification utilize a divinyl water-soluble monomer in conjunction with a water-soluble monovinyl monomer. A system of this latter type results in the use of aqueous solutions of acrylamide and methylene bis acrylamide. Such systems, which include a catalyst in conjunction therewith, are described in U.S. Pat. No. 2,801,984. Another system is described in U.S. Pat. No. 3,417,567 which utilizes, for the most part, acrylic acid esters in conjunction with a monomeric water-soluble vinyl monomer such as an acrylate salt or a water-soluble hydroxy alkyl acrylate. A glycerol diacrylate may be used as one of the components.

THE INVENTION

A process of stabilizing soil which comprises contacting from about 3 to about 20 parts by weight of such soil with about one part by weight of an aqueous solution of a water-soluble diacrylate ester of a polyoxyalkylene glycol monomer having a molecular weight of at least 300, which solution also contains a water-soluble free radical polymerization catalyst capable of polymerizing the monomer into a water-insoluble gel.

The expression, "water-soluble diacrylate ester of a polyoxyalkylene glycol monomer," which is subsequently polymerized in the process of the invention, is intended to include aqueous solutions which also contain water-soluble comonomers which are capable of copolymerizing with the diacrylate ester. Such water-soluble vinyl monomers are included in the solution in amounts between 2-50% by weight of the diacrylate.

The water-soluble diacrylate esters of polyoxyalkylene glycols may be prepared from acrylic acid, methacrylic acid, ethacrylic acid and other lower alkylene substituted acids, the number of carbon atoms in the alkylene group being not greater than 4. The polyoxyalkylene glycols which are diesterified include those having molecular weights of at least 300 with molecular weights between 400–1000 being preferred. A preferred monomer is a polyoxyethylene dimethacrylate ester wherein the polyoxyethylene portion of this monomer has a molecular weight of between 400 and 600.

Typical of the vinyl monomers that can be copolymerized with the acrylate diester described above are: acrylamide, methoxyethylacrylate, ethoxyethylacrylate, acrylic acid and its alkali metal and alkaline earth metal salts, and dimethylaminoethylmethacrylate.

The amount of aqueous solution used to treat the soil will vary depending upon the soil and the diacrylate esters used. Typically, from about 3 to about 20 parts by weight of soil will be treated with one part by weight of an aqueous solution containing the monomer or monomers mentioned above along with an appropriate catalyst system to be described. The aqueous solution may contain as little as one-half of one weight percent total monomer and may contain up to saturation levels of monomer or mixture of monomers. To obtain optimum results, soil samples should be obtained and tested using known laboratory techniques.

The Water-Soluble Polymerization Catalyst

This catalyst may be selected from any number of water-soluble free-radical polymerization catalysts. It is preferably an inorganic redox catalyst system generating a free radical initiated polymerization reaction with a possible system being a 1:1:1 molar ratio of ammonium persulfate, sodium sulfite and ferrous sulfate. The redox systems used preferably are capable of initiating polymerization at the ambient temperature of soil in a number of climatic conditions.

Additional catalysts of this type are described in U.S. Pat. No. 2,801,984, incorporated herein by reference. Other catalyst systems such as amines plus persulfates and the water-soluble azobis compounds, particularly 2,2'-azobis (2-amidinopropane) and 4—4' azobis (4-cyano valeric acid) may be used. The amounts of the acrylate diester and catalyst placed into water to produce the aqueous solutions may vary from as little as 0.5 weight percent up to the saturation solubility of the ingredients. In most instances, 5–20% solutions provide useful soil treating agents. The catalyst is normally present at a weight ratio of at least 0.005 relative to total monomer present in the aqueous solution used to treat the soil. To illustrate the advantages of the invention, the following data was obtained:

TABLE I

The following data was obtained in a series of experiments using polyoxyethylene (MW 600) dimethacrylate (Comp. A) as the main monomer.

| Monomer Concentr. In Water, % | Monomer Composition % | Reaction Time, sec. | Penetrometer Reading | Water Pick-Up After 20 Hrs. |
|---|---|---|---|---|
| 10 | 100 Comp. A | 45 | 260 | 5.3 |

TABLE I-continued

The following data was obtained in a series of experiments using polyoxyethylene (MW 600) dimethacrylate (Comp. A) as the main monomer.

| Monomer Concentr. In Water, % | Monomer Composition % | Reaction Time, sec. | Penetro- meter Reading | Water Pick-Up After 20 Hrs. |
|---|---|---|---|---|
| 10 | 95 Comp. A 5 TEGDA[1] | 20 | 220 | 6.4 |
| 10 | 90 Comp. A 10 TEGDA | 20 | 230 | 8.9 (72 hrs.) |
| 10 | 80 Comp. A 20 TEGDA | 20 | 220 | |
| 12.5 | 80 Comp. A 20 TEGDA | 20 | 200 | |
| 12.5 | 20 Comp. A 80 TEGDA | 55 | 270 | |
| 10 | 90 Comp. A 10 HPA[2] | 10 | 183 | |
| 10 | 80 Comp. A 20 HPA | 10 | 170 | |
| 10 | 90 Comp. A 10 HEA[3] | 15 | 200 | |
| 10 | 80 Comp. A 20 HEA | 15 | 210 | 4.9 |
| 10 | 90 Comp. A 10 HEA | 15 | 210 | |
| 10 | 95 Comp. A 5 EEA[4] | 20 | 220 | |
| 10 | 90 Comp. A 10 EEA | 20 | 226 | |
| 10 | 890 Comp. A 20 EEA | 20 | 240 | 6.9 |
| 10 | 95 Comp. A 5 MEA[5] | 20 | 220 | |
| 10 | 90 Comp. A 10 MEA | 20 | 193 | |
| 10 | 90 Comp. A 10 ACM[6] | 20 | 220 | 4.7 |
| 10 | 80 Comp. A 20 ACM | 20 | 210 | 5.6 |
| | 95 Comp. A* 5 DMAEM[7] | 30 | 230 | 3.3 |
| 10 | 90 Comp. A* 10 DMAEM | 30 | 168 | 7.4 |
| 10 | 80 Comp. A* 20 DMAEM | 45 | 173 | 9.5 |
| 10 | 90 Comp. A* 10 Sipomer Q-5[8] | 45 | 283 | 11.3 |
| 10 | 80 Comp. A* 20 Sipomer Q-5 | 45 | Too soft To Measure | |

[1]TEGDA — tetraethyleneglycol diacrylate
[2]HPA — hydroxy propyl acrylate
[3]HEA — hydroxyethylacrylate
[4]EEA —ethoxyethylacrylate
[5]MEA — methoxyethylacrylate
[6]ACM — acrylamide
[7]DMAEM — dimethylaminoethylmethacrylate
[8]Sipomer Q-5 — dimethylaminoethyl methylacrylate methyl sulfate quaternary
*sodium bisulfite — ammonium persulfate catalyst The following recipe was used to generate the data in Table I, except when the asterisk indicates a different redox free radical catalyst system. RECIPE: Add monomers to proper amount of deionized water, add 1 ml. of 20% sodium bisulfite solution, then 1 ml. of 5% ferric sulfate solution.

In the above table the penetrometer readings were obtained using a standard grease penetrometer. Any value less than 280 is considered to be satisfactory.

I have also examined performance of the grouting systems of this case in composites with sand. This was done to simulate behavior of the grouting chemical and the treated soil under use conditions.

The composites with sand were prepared in the following way:
1. Weight about 25 g of DI water into a dish.
2. Add desired weight of POE 600 dimethacrylate.
3. Weigh in desired amount of calcium acrylate if this monomer is used, or any other comonomer.
4. Add sufficient amount of water to bring total weight to 50 g.
5. Stir to obtain a homogeneous solution.
6. Add 0.3 cc triethanolamine and stir.
7. Add 0.75 cc of 40% ammonium persulfate solution with stirring.
8. Add 225 g of sand making sure that all the sand is wetted. Signs of gellation are observed after about five minutes.

The final compositions of the composites were approximately:

| Polymer | 2% |
|---|---|
| Water | 16% |
| Sand | 82% |

EXAMPLE A

The monomer composition in this example leading to the water insoluble gel consisted of 95 parts of the dimethacrylate ester of a 600 molecular weight polyoxyethylene glycol plus 5 parts of calcium acrylate. The monomer concentration in the aqueous phase of the composite was 12%. The composite with sand in the shape of the dish in which it was prepared was submerged in water at room temperature and its weight was monitored with time. There was a weight gain of 0.4% in the first 24 hours with no change after 48 hours; after 72 hours the weight gain was 0.5%. The penetrometer readings during this period of time were within the 33 and 49 readings.

EXAMPLE B

The monomer composition in this example was 100% dimethacrylate ester of polyoxyethylene glycol of molecular weight 600. The concentration in the aqueous phase of the sand composite was 11.5%. The sand composite under water gained 0.1% weight after 24 hours, 0.02% after 48 hours, and 0.08% after 72 hours. The durometer reading in that period of time was comprised between 35 and 66.

EXAMPLE C

This example was the same as Example B, except that the concentration of the dimethacrylate of polyoxyethylene glycol in the aqueous phase was 12.0%. The water gain of the sand composite under water was 0.1% after 24 hours, 0.1% after 48 hours, and 0.09% after 72 hours. Penetrometer readings in this period were comprised between 34 and 49.

EXAMPLE D

This example was run for comparison, using a monomer system used commercially, i.e., acrylamide and methylene bis acrylamide in a 90:10 weight ratio. The monomer concentration in the water phase of the sand composite was 10%. The weight gain of the immersed composite was 0.2% after 24 hours, 0.2% after 48 hours, 0.3% after 72 hours. Penetrometer readings during this period of time were comprised between 22 and 40.

The above data is construed to indicate that consolidated soil of suitable strength is obtained with the novel systems of this invention and that the systems showed the necessary stability with time.

The four examples above contained from 1.8 to 2.2% of various type systems (1.8% if the monomer content of the liquid phase was 10%; 2.2% if the concentration was 12%). I arbitrarily selected one of the grouting compositions that gave good results at the standard concentration of 2.2% total monomer in the sand composite and explored composites with decreasing amount of grouting monomer actives. The composition consists of 65% PEG 400 dimethacrylate plus 35% calcium acrylate. Levels of 0.3, 0.8, 1.0, 1.2, and 1.5% total monomer actives were examined.

With a 2.2% monomer active level, consolidation started to take effect after about 10 minutes. A penetrometer measurement on the sand composite after 24 hours immersion in water read 49. With a 1.5% active in the composite, consolidation was observed after about 30 minutes standing. Penetrometer reading after 24 hours immersion in water was now 85. With a 1.2% active, the sand composite took roughly 24 hours to consolidate. Penetrometer reading was 130, which is still an acceptable value.

Composites prepared with 1.0% monomer actives of this particular monomer composition and this particular sand aggregate were not self-supporting.

Having thus described my invention, it is claimed:

1. A process of stabilizing soil which comprises contacting from about 3 to about 20 parts by weight of such soil with about one part by weight of an aqueous solution containing at least 0.5 weight percent of a water-soluble diacrylate ester of a polyoxyalkylene glycol monomer having a molecular weight of at least 300, which solution also contains a water-soluble free radical polymerization catalyst capable of polymerizing the monomer into a water-insoluble gel.

2. The process of claim 1 where the aqueous solution also contains from between 2 and 50% by weight of a water-soluble vinyl monomer capable of copolymerizing with the water-soluble diacrylate ester of a polyoxyalkylene glycol.

3. The process of claim 2 where the water-soluble vinyl monomer is acrylamide.

4. The process of claim 2 where the water-soluble vinyl monomer is methoxyethylacrylate.

5. The process of claim 2 where the water-soluble vinyl monomer is ethoxyethylacrylate.

6. The process of claim 2 where the water-soluble vinyl monomer is dimethylaminoethylmethacrylate.

7. The process of claim 2 where the water-soluble vinyl monomer is tetraethyleneglycol diacrylate.

8. The process of claim 2 where the water-soluble vinyl monomer is hydroxypropylacrylate.

9. The process of claim 2 where the water-soluble vinyl monomer is dimethylaminoethylmethylacrylate Me $So_4$ quat.

10. The process of claim 2 where the water-soluble vinyl monomer is acrylic acid or the alkaline earth or alkali metal salts of acrylic acid or mixtures thereof.

* * * * *